(12) United States Patent
Rocktäschel et al.

(10) Patent No.: US 9,487,636 B2
(45) Date of Patent: Nov. 8, 2016

(54) FLAMEPROOFING

(75) Inventors: Christian Rocktäschel, Dohna (DE); Heinzhorst Möbius, Saal/Donau (DE)

(73) Assignee: FLUORCHEMIE GMBH FRANKFURT, Frankfurt (DE)

( * ) Notice: Subject to any disclaimer, the term of this patent is extended or adjusted under 35 U.S.C. 154(b) by 378 days.

(21) Appl. No.: 14/004,777

(22) PCT Filed: Mar. 23, 2011

(86) PCT No.: PCT/EP2011/001454
§ 371 (c)(1),
(2), (4) Date: Sep. 12, 2013

(87) PCT Pub. No.: WO2012/126487
PCT Pub. Date: Sep. 27, 2012

(65) Prior Publication Data
US 2013/0345351 A1 Dec. 26, 2013

(51) Int. Cl.
*C09K 21/02* (2006.01)
*C08K 3/00* (2006.01)
*H01B 7/295* (2006.01)
*C08K 3/22* (2006.01)

(52) U.S. Cl.
CPC ............ *C08K 3/0058* (2013.01); *C09K 21/02* (2013.01); *H01B 7/295* (2013.01); *C08K 3/22* (2013.01)

(58) Field of Classification Search
CPC ....... C09K 21/02; C08K 3/0058; C08K 3/22
See application file for complete search history.

(56) References Cited

U.S. PATENT DOCUMENTS 6,248,302 B1 * 6/2001 Barnett .................. C01G 23/00
423/132

FOREIGN PATENT DOCUMENTS

| CN | 101624457 A | 1/2010 |
| DE | 2627504 A1 | 12/1977 |
| FR | 978108 A | 4/1951 |
| JP | 57-85854 | 5/1982 |
| JP | 07-315830 | 12/1995 |
| JP | 09-296116 | 11/1997 |

OTHER PUBLICATIONS

International Search Report mailed Dec. 23, 2011 (PCT/EP2011/001454); ISA/EP.
Sunil K. Sharma et al: Fire Technology. vol. 38. No. 1. Jan. 1, 2002. pp. 57-70. XP55012990. ISSN: 0015-2684. DOI: 10.1023/A:1013428831840 Introduction; Results and Discussion table 1.

* cited by examiner

*Primary Examiner* — Peter D Mulcahy
(74) *Attorney, Agent, or Firm* — Banner & Witcoff, Ltd.

(57) ABSTRACT

The present disclosure relates to an inorganic, halogen-free flameproofing agent made of modified, rehydrated red mud (MR2S), having a mineral composition of 10 to 50 weight percent of iron compounds, 12 to 35 weight percent of aluminum compounds, 5 to 17 weight percent of silicon compounds, 2 to 21 weight percent of $TiO_2$, and 0.5 to 6 weight percent of calcium compounds, wherein the compounds of iron have a hydroxide and oxide hydrate fraction greater than or equal to 50 weight percent relative to the oxide fraction of the iron compounds, and wherein the compounds of aluminum have a hydroxide and oxide hydrate fraction greater than or equal to 50 weight percent. The disclosure further relates to a flameproofed material system comprising a flammable material and the inorganic, halogen-free flameproofing agent and to a method for the production thereof.

14 Claims, 8 Drawing Sheets a) b) c)

FLAMEPROOFING

CROSS-REFERENCES TO RELATED APPLICATION

The present application is a U.S. National Phase filing of International Application No. PCT/EP2011/001454, filed on Mar. 23, 2011, designating the United States of America and this application claims priority to and the benefit of the above-identified application which is incorporated by reference herein in its entirety.

TECHNICAL FIELD

The present disclosure relates to the field of inorganic flameproofing agents (IFA).

BACKGROUND

Flameproofing agents are fire inhibitors which are intended to restrict, slow down or prevent the spread of fires.

Flameproofing agents are used wherever potential sources of ignition are located, or where the use of combustible materials constitutes a safety risk.

Rising demands for safety and the increasing use of high-grade plastics instead of metals and metal alloys, for example in the construction industry, aircraft and automobile manufacture and in interior fittings, have led to an increasing need for flameproofing agents.

The mode of action of flameproofing agents is based on different effects:
  interruption of the radical chain reaction of the gases produced during pyrolysis of the material;
  forming a protective coating of charred material (intumescence) in order to prevent the access of oxygen and heat;
  cooling of the combustion process by initiation of an endothermic decomposition or evaporation of bound water;
  dilution of the combustible gases by inert, gaseous substances;
  liquefaction, i.e. formation of a melt which flows out of the fire zone and simultaneously reduces the surface area.

Most flameproofing agents trigger one or more of the said chemical-physical effects:

Therefore the following four types of flameproofing agent are distinguished:
  additive flameproofing agents—these are incorporated into the combustible substances;
  reactive flameproofing agents—substances which are themselves components of the material by polymerisation into plastics;
  inherent flameproofing agents—the material per se is flame-resistant;
  coating—the flameproofing agent is applied as a coating onto the combustible substance from the outside.

Important reactive and inherent, but also additive flameproofing agent have been criticised for toxicological reasons, i.e. formation of toxic gases during the decomposition process, and are now subject to a strict risk assessment so that inorganic flameproofing agents have gained increasing importance:

Worldwide production figures can be found, for example, in the report from the Danish Environmental Protection Agency ("Brominated Flame Retardants. Substance Flow Analysis and Assessment of Alternatives" (1999)). Accordingly the groupings of the flameproofing agents are broken down as follows:
50% inorganic flameproofing agents (IFA), for example ATH ($Al(OH)_3$) and MDH ($Mg(OH)_2$),
25% halogenated flameproofing agents,
20% organophosporus compounds,
5% nitrogen-based flameproofing agents.

In terms of quantity, aluminium hydroxide (ATH) is employed as the most important inorganic flameproofing. ATH is obtained from bauxite using the Bayer process. This produces red mud (RM) as a waste product. Therefore in the following description red mud (RM) is understood to be the residue from the Bayer process which is produced in the extraction of ATH from bauxite.

Red mud (RM), which may to some extent be represented as bauxite minus ATH, is an extremely heterogeneous substance (cf. Table 1), for example with regard to its chemical and mineralogical composition, its endothermic properties, its pH value, etc. The cause of the heterogeneity sometimes lies in the differing composition of the bauxites used, but above all in whether the Bayer process operates by autoclave digestion or by tube digestion. In the autoclave process the digestion is carried out with 30 to 35% caustic soda solution at temperatures of 170-180° C., so that a pressure of 6 to 8 bars is established. The tube digestion process was developed in order to shorten the reaction time of 6 to 8 hours to less than 1 hour by increasing the temperature to 270° C. However, at this temperature a water vapour pressure of 60 bars is established at the end of the reactor. The higher temperatures of the tube digestion also influence the composition of the red mud. For example, in the system $Fe-O_2-H_2O$ in the tube digestion process the balance is shifted almost completely towards haematite.

In the past, because of the heterogeneity of the red mud (RM) no significant economic use could be found. In this respect red mud (RM) is almost exclusively disposed of as waste at disposal sites.

SUMMARY

The technical object underlying aspects of this disclosure is therefore the prevention of the above-mentioned disadvantages by the provision of a novel, economically viable inorganic flameproofing agent.

This object is achieved according to example embodiments of this disclosure by the appended independent claims. Other exemplary advantageous modifications and embodiments are defined in the dependent claims.

The present disclosure relates to an inorganic halogen-free non-toxic flame retardant. In certain examples, the retardant with a mineral composition of 10-50% by weight of iron compounds, 12-35% by weight of aluminium compounds, 5-17% by weight of $SiO_2$, 2-21% by weight of $TiO_2$, 0.5-6% by weight of CaO and 3-10% by weight of $Na_2O$.

To this end in the inorganic flameproofing agent according to example embodiments the ratio of hydroxides/oxide hydroxide of the aluminium to oxides of the aluminium is greater than or equal to 1 (i.e. at least 50% by weight, preferably 80% by weight of hydrates/oxide rate) and the ratio of oxide hydroxide of iron to oxides of iron is greater than or equal to 1 (i.e. at least 50% by weight, preferably 80% by weight oxide hydroxide). It is also provided that the inorganic flameproofing agent is modified rehydrated red mud (MR2S).

Moreover it may be advantageous that in the modified rehydrated red mud (MR2S) the proportion of soluble $Na_2O$ is less than or equal to 0.03% by weight, the mean particle size (d 50) is less than or equal to 50 μm, preferably 0.5 to 10 μm, and the residual moisture is less than or equal to 0.4% by weight. As a result an economically viable use of the red mud (RM) has been developed which inter alia reduces the problem of the disposal of red mud (RM) as expensive hazardous waste.

Furthermore, the present disclosure discloses a fireproofed material system comprising a combustible material, a flame-retardant agent, and a process for production of fireproofed material systems, comprising the steps: providing a combustible material, blending or coating the combustible material with the flame-retardant agent of example embodiments and thereby obtaining a fireproofed material system.

Thus so-called modified rehydrated red mud (MR2S) is provided, which proves to be an outstanding inorganic flameproofing agent. Surprisingly, moreover, it has been found that when the modified rehydrated red mud (MR2S) provided in this way is incorporated into combustible substances, e.g. polymers, as inorganic flameproofing agent (IFA), in the event of fire a vitrification or sintering of the ash takes place. Vitrification or sintering is understood to mean that, in the event of fire, the combustible substances into which the IFA has been incorporated neither become fluid nor are they present thereafter as fly ash. On the contrary, a state of the ash is reached which still has certain mechanical characteristics, in particular a special stability. This is particularly advantageous since as a result for example it avoids the formation of fly ash which could be inhaled. This is furthermore particularly advantageous as thereby likewise no liquefaction of the combustible systems takes place, so that spreading of the fire is reduced. Furthermore it is particularly advantageous that thereby the supply of oxygen in the core of the combustible systems is reduced, so that a further or continuous combustion is prevented. The vitrification of the ash acts particularly advantageously for example on the insulations of cables which as a result retain their functionality even in the event of fire.

If red mud (RM) is subjected to modifications, it proves to be an excellent halogen-free inorganic flameproofing agent. Modification may be understood for example as follows:
  supply of red mud (RM),
  analysis of the constituents of the supplied red mud (RM),
  rehydration of the red mud,
  physical processing of the rehydrated red mud.
  Further modifications may for example be as follows:
  washing of the supplied red mud (RM), for example with water,
  washing of the rehydrated red mud (RM), for example with water,
  drying of the rehydrated red mud,
  physical processing of the rehydrated red mud, in order advantageously to obtain a desired grain size distribution, for example by grinding and sieving.
  compounding of the dried and physically processed rehydrated red mud for example with a plastic matrix,
  admixture of endothermically reacting substances such as ATH (gibbsite, boehmite), magnesium hydroxide (MDH) or goethite, etc., in order to optimise the thermal characteristics and optionally to extend the temperature range in which the inorganic flameproofing agent (IFA) reacts.

During the rehydration oxidic substances of e.g. Al or Fe are converted into hydroxidic substances: boehmite (Al oxide hydroxide) is converted into gibbsite (Al(OH)$_3$), $Al_2O_3$ is converted into gibbsite, haematite (iron oxide) is converted into goethite (iron oxide hydroxide). Thus substances with the highest possible endothermic potential are produced from substances which exhibit no or only a little action in the desired range of action from 180 to 350° C. Due to this process which changes the chemical and mineralogical composition of red mud (RM), the endothermic enthalpy and thus the flame-retardant effect is increased so that an inorganic flameproofing agent (IFA) with a clearly defined action is produced, regardless of whether the RM originates from an autoclave digestion or a tube digestion.

The modified rehydrated red mud (MR2S) thus produced can be supplied with defined characteristics for its application as inorganic flameproofing agent (IFA) in the respective material systems. The higher the endothermic enthalpy after the rehydration is, the lower the degree of filling in the material system has to be.

Since the endothermic reaction of modified rehydrated red mud (MR2S) covers a temperature range of approximately 180° C. to 350° C., the use of ATH and/or MDH can be partially or completely replaced by modified rehydrated red mud (MR2S), i.e. by one single substance.

Modified rehydrated red mud (MR2S) can be modified with regard to its surface area, in particular in order to simplify the incorporation into the material system.

In particular, modified rehydrated red mud (MR2S) can be coated with nanoclays. As a result a further improved vitrification of the ash is produced in the event of fire. The clay-like compounds contained in the modified rehydrated red mud (MR2S) also produce a vitrification of the ash by themselves.

In particular, finely divided modified rehydrated red mud (MR2S) tends towards sintering at high temperatures, so that the described vitreous ashes are produced.

To summarise, modified rehydrated red mud (MR2S) covers the fields of application of ATH and MDH and goes beyond this in its fire retardant action. By coating with nanoclay the problem of the ash is solved by an improved vitrification. Since red mud (RM) is available in large amounts as basic raw material for modified rehydrated red mud (MR2S), it is possible in particular for all mass-produced articles to be provided cost-effectively with inorganic flameproofing agents (IFA) as economic values.

For the incorporation of the inorganic flameproofing agent (IFA) into combustible substances, for example polymers, the proportion of water-soluble soda (expressed in % by weight of $Na_2O$) must be reduced as far as possible in order to increase the water resistance of the polymers. Naturally this applies in particular to the insulations of cables.

A fireproofed material system is disclosed which comprises a combustible material and a flame-retardant agent (referred to below as flameproofing agent or flame retardant), characterised in that the flame-retardant agent comprises a mineral composition which comprises
  10-50% by weight of iron compounds
  12-35% by weight of aluminium compounds
    5-17% by weight $SiO_2$,
    2-10% by weight $TiO_2$,
    0.5-6% by weight CaO and
    3-10% by weight $Na_2O$.

The mineral composition may in particular be modified rehydrated red mud (MR2S). It is crucial that the compounds of iron and of aluminium are predominantly present as hydroxides or oxide hydroxide and not as oxides. All compounds of aluminium and of iron are converted predominantly into hydroxides or oxide hydroxide by the process of rehydration. In the case of aluminium, gamma $Al_2O_3$ and boehmite are converted into gibbsite, and in the case of iron, haematite is converted into goethite. In this way the highest possible stage of the endothermic enthalpy is reached and thus the highest possible flame inhibition.

The material system may be a building material, a plastic product, a rubber product, a chipboard, or a cable insulation or sheathing made of one or more polymers.

The material system can comprise the flame retardant in a proportion of 3-95% by weight.

The flame-retardant agent can comprise the mineral composition (MR2S) in a proportion of 30-100% by weight and the respective remaining proportion of 0-70% by weight can be formed by a further flame-retardant composition or flame-retardant additive.

The further flame-retardant composition or flame-retardant additive may comprise an inorganic non-toxic endothermically reacting substance.

The further flame-retardant composition or flame-retardant additive may comprise salt hydrates, hydroxides and carbonates.

The content of soluble $Na_2O$ is adjusted to <0.03% by weight, or 0.003% by weight, or 0.003-0.03% by weight.

The present document also discloses the use of the flame retardant described above as flame retardant for combustible material systems, combustible building materials, plastic, rubber, chipboard material, or cable sheathings.

Furthermore, the present document discloses a process for production of fireproofed material systems, comprising the steps:
a. providing a combustible material,
b. blending or coating the combustible material with the flame-retardant agent, and thereby
c. obtaining a fireproofed material system.

The mineral composition in the flame-retardant agent referred to in step b. may be fine-grained and may preferably have a mean particle size (d50) of 0.5-50 μm, preferably 0.5-10 μm.

The flame-retardant agent may be physically processed, in particular ground, before the blending or coating in the step b.

The flame-retardant agent may be subjected to a surface treatment, in particular a coating with substances which improve the compatibility of the flame-retardant agent with a polymer matrix or which bring about an improved vitrification of the ash, which in the event of fire prevents the diffusion of the oxidising (pyrolysis) gases to the flame front, or isolates the surface and in the case of cable systems ensures the functionality for as long as possible under fire conditions.

For coating of the surface of the flame-retardant agent, in particular silanes, fatty acids and softeners as well as known processes are used. For improvement of the vitrification of the ash, in particular nanoclays, boric acid and metal derivatives and zinc stannate and/or zinc hydroxystannate and combinations of aforesaid compositions. Possible smouldering is also prevented in this way.

DETAILED DESCRIPTION

Definitions

The expression "fireproofed material system" is understood to mean a device in which a combustible material is brought into contact with a flame-retardant agent so that the ignition of the combustible material present in the device by fire or heat is prevented or slowed down. In particular the flame-retardant agent is permanently associated with the combustible material, for example by blending or coating.

"Flame-retardant agents" within the context of this disclosure are understood to be flameproofing agents, in particular non-toxic, halogen-free inorganic flameproofing agents, in particular modified rehydrated red mud (MR2S).

Combustible materials or flammable materials are understood to be any materials which are combustible or flammable, in particular polymers and non-volatile hydrocarbons. Examples are acrylic dispersions, acrylic resins, elastomers, epoxy resins, latex dispersions, melamine resins, polyamide (PA), polyethylene (PE), PE copolymers, thermoplastic PE copolymers, cross-linked PE copolymers, phenolic resins, polyester resins (UP), polyurethane, polypropylene (PP), polyvinyl chloride (PVC), PVC plastisols, thermoplastic elastomers based on urethane (TPU), vinyl ester resins, bitumen and the like. "Combustible" and "flammable" should be understood here as synonyms.

Red mud (RM) is understood to be the residue from the Bayer process which is produced in the extraction of ATH from bauxite. Modified rehydrated red mud (MR2S) is understood to be a product which is produced from red mud (RM) by rehydration, drying, grinding, admixture of other substances, coating of the surface, etc. Modified rehydrated red mud (MR2S) has a moisture content of at most 0.4% by weight, a content of soluble $Na_2O$ of <0.03% by weight and a grain size (d 50) of 0.5-50 μm, preferably of 0.5 to 10 μm.

Subject Matter of the Disclosure

In the present disclosure, so-called modified rehydrated red mud (MR2S) is employed as inorganic flameproofing agent (IFA).

Red mud results from alumina production according to the Bayer process. In the Bayer process suitable bauxite is dried and ground, mixed in the calculated ratio with aqueous concentrated caustic soda solution and is broken up in the autoclave process or in the tube digestion process at elevated temperatures and pressures. The resulting Na aluminate solution is separated. After dilution the ATH is precipitated out by stirring with freshly precipitated ATH as seed crystal. Alumina, $Al_2O_3$ is produced from aluminium hydroxide (ATH) and aluminium metal is produced from the alumina.

The residue which is not released in the autoclave process or in the tube digestion process is separated, washed, concentrated and deposited as "red mud" at disposal sites. The name "red mud" comes from its red colour due to a high iron content.

Depending upon the quality of the bauxite used, for every tonne of aluminium produced 1-2 tonnes of red mud with a water content of approximately 50% are produced as an inevitable co-product. Many millions of tonnes are produced per year which, together with the amounts already deposited at disposal sites constitute a serious problem. Since it has not been possible hitherto to send red mud on the relevant scale for an economically viable use, it is still regarded as waste and sent for disposal. The disposal of the red mud is carried out primarily by storage in sealed disposal sites. This form of storage is expensive and complex, since large disposal areas are required and high costs accrue for transport of the red mud. Moreover the long-term costs arising from the use of disposal sites, above all for monitoring of the sites, constitute an economic problem. The development of an economically viable use for the red mud is therefore urgently required.

The composition of dried red mud is substantially determined by the composition of the bauxite used. The carrying out of pressure leaching with NaOH in the Bayer process in the autoclave or tube digestion process also has a major effect. A typical composition and average bandwidths are given in percentages by weight in Table 1. Since in earlier times the Bayer process was carried out less effectively, red muds which deviate from this composition are also to be found at disposal sites.

TABLE 1

Composition of red muds

| Constituent | Typical Composition % | Bandwidth (%) |
|---|---|---|
| $Fe_2O_3$ | 40 | 10-50 |
| $Fe_2O_3$ | 25 | 10-30 |
| $SiO_2$ | 15 | 3-25 |
| $TiO_2$ | 7 | 2-24 |
| CaO | 1 | 0.5-10 |
| $Na_2O$ | 9 | 2-20 |
| other | 3 | 0-3 |

Mineralogically, red mud (RM) forms a mixture of different minerals and oxides which, as already mentioned, is substantially determined by the composition of the bauxite used and the leaching process. RM contains for example gibbsite, boehmite, gamma $Al_2O_3$, goethite, haematite, rutile, anatase, quartz, kaolinite, hydroxy sodalite, calcite and other substances.

Measurements of the grain size distribution show that RM occurs as a very fine powder.

Further investigations, such as for example with the aid of differential thermoanalysis (DTA), show that red mud (RM) has endothermic reactions. The reason is that there are still residues of hydroxides or oxide hydroxide of aluminium (gibbsite and boehmite) and of iron (goethite) contained in the red mud (RM), which react endothermically and eliminate water. However the endothermic behaviour fluctuates from very weak to clearly perceptible. This behaviour is exhibited by both freshly produced RM and RM deposited at disposal sites. Broad analytical investigations explain this phenomenon: only the residues of hydroxides and oxide hydroxide in the RM such as for example gibbsite, boehmite or goethite exhibit the described endothermic behaviour including elimination of water in the temperature range from approximately 180° C.-350° C. These residues depend crucially upon the bauxites used, but above all upon the digestion process and the temperatures and pressures used therefor. The higher the temperatures are during digestion, the more the balance shifts, in the case of Al and Fe compositions, from the hydroxides, via the oxide hydroxide to the pure oxides, which no longer exhibit an endothermic reaction in the preferred temperature range from 180 to 350° C. Therefore there are considerable fluctuations in the endothermic behaviour and the required elimination of water. Thus red mud (RM) precipitated during the production process cannot be used as a defined IFA.

According to example embodiments of the present disclosure, red mud (RM) is modified, in particular rehydrated, in order to significantly boost its endothermic behaviour and the elimination of water and thus to open up the chance of producing a highly effective reproducible and to some extent standardised inorganic flame retardant. In the case of aluminium the path leads via the conversion of aluminium oxide and aluminium oxide hydrates to aluminium hydroxides, i.e. gamma $Al_2O_3$ becomes ATH (gibbsite) and the aluminium oxide (boehmite) becomes ATH (gibbsite). In the case of iron, iron oxide (haematite) is converted into iron oxide hydroxides (goethite). Thus after rehydration all compounds of aluminium and of iron are predominantly present as hydroxides/oxide hydroxide, so that the product which is then present as modified rehydrated red mud (MR2S) can fully develop its maximum possible potential as IFA, because only hydroxides and oxide hydroxide exhibit the endothermic reaction and elimination of water.

With regard to its chemical and mineralogical composition, by comparison with red mud (RM) which occurs as a waste product in the Bayer process, modified and rehydrated red mud (MR2S) is a completely different product produced by chemical reaction from red mud (RM). The modified rehydrated red mud (MR2S) predominantly contains hydroxides and oxide hydroxide. By the modifications, as described, for the first time marketable products can be produced for non-toxic halogen-free inorganic flameproofing.

Production of MR2S

The production of modified rehydrated red mud (MR2S) takes place in principle by treatment of the red mud (RM) with inorganic mineral acids, in particular with sulphuric acid or with hydrochloric acid.

Thus for example red mud (RM) can be combined with concentrated (e.g. 96% or 70%) sulphuric acid. With regard to dissolving behaviour, the optimal temperatures and acid concentration for the respective red muds present can be set by addition of water. In this case Al hydroxides such as gibbsite, aluminium oxide hydroxide such as boehmite and gamma $Al_2O_3$, but also iron oxide hydroxide such as goethite and iron oxides such as haematite largely dissolve to sulphates of aluminium and iron.

By the rehydration Al and Fe salt can be recovered as hydroxides or oxide hydroxide. By the conversion of the oxides and oxide hydroxides into hydroxides, the endothermic enthalpy is increased with reference to the chemical composition of the red mud (RM) used as basic raw material. The ratio of hydroxides/oxide hydroxides to oxides after the rehydration is largely on the side of the hydroxide.

After treatment of the red mud (RM) with acids, the acidic filtrate of the insoluble residue can be separated and the precipitation of the hydroxides or oxide hydroxides takes place in isolation from the insoluble filter residue.

Thus the rehydration takes place in that the normally alkaline red mud (RM) is transformed into an acidic area and after the oxides and hydroxides/oxide hydroxides are dissolved it is realkalised again. In this case the metal salts, in particular metal sulphates are precipitated out as hydroxides or oxide hydrates. The content of oxides is considerably reduced or completely transformed into hydroxides/oxide hydroxides.

While in the customary inorganic flame retardants such as ATH the production only takes place in the alkaline range and for example the content of soluble $Na_2O$ and the pH value have to be optimised by washing, in the production of modified rehydrated red mud (MR2S) by changing the medium from alkaline to acidic and then neutral to alkaline, products can be recovered which with regard to thermal behaviour, but also with regard to chemical characteristics such as for example content of soluble $Na_2O$, etc., can be optimised and tailored to the particular application. Thus for example by "titration" from acidic to alkaline a content of soluble $Na_2O$ of less than 0.003% by weight can be set.

The general description of the production process of modified rehydrated red mud (MR2S) shows that with modified rehydrated red mud (MR2S), by modification, in particular rehydration of red mud (RM), a new substance can be recovered which differs in its composition from the initial red mud and is novel with regard to chemical and mineralogical composition, with regard to its thermal behaviour and its physical behaviour and for its particular application and the properties necessary therefor it can be adjusted specifically and reproducibly.

Figure 1:
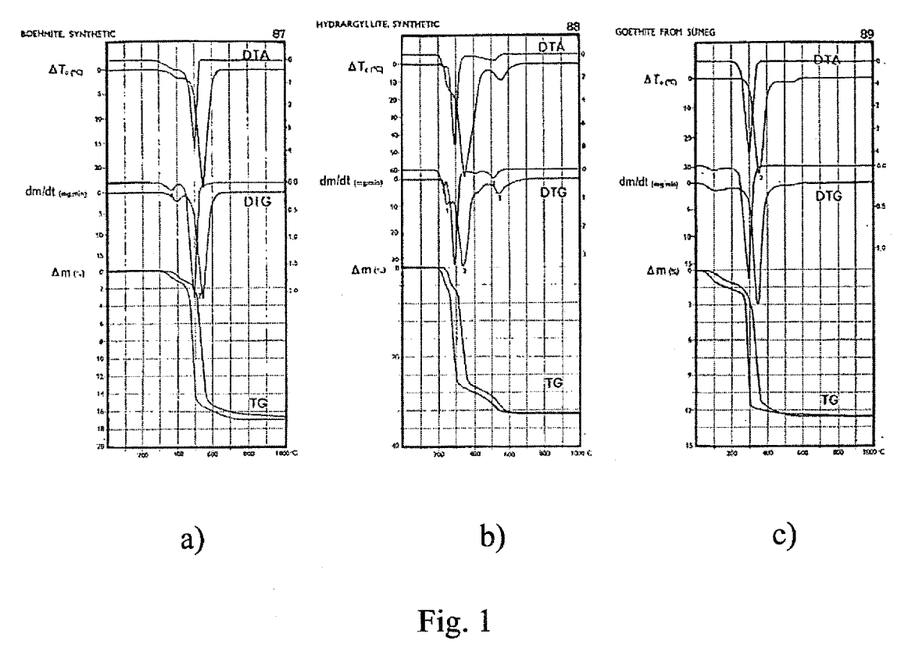
FIG. 1 shows thermoanalytical curves (DTA) of boehmite (FIG. 1a), hydrargillite (gibbsite) (FIG. 1b) and goethite (FIG. 1c)
Figure 2:
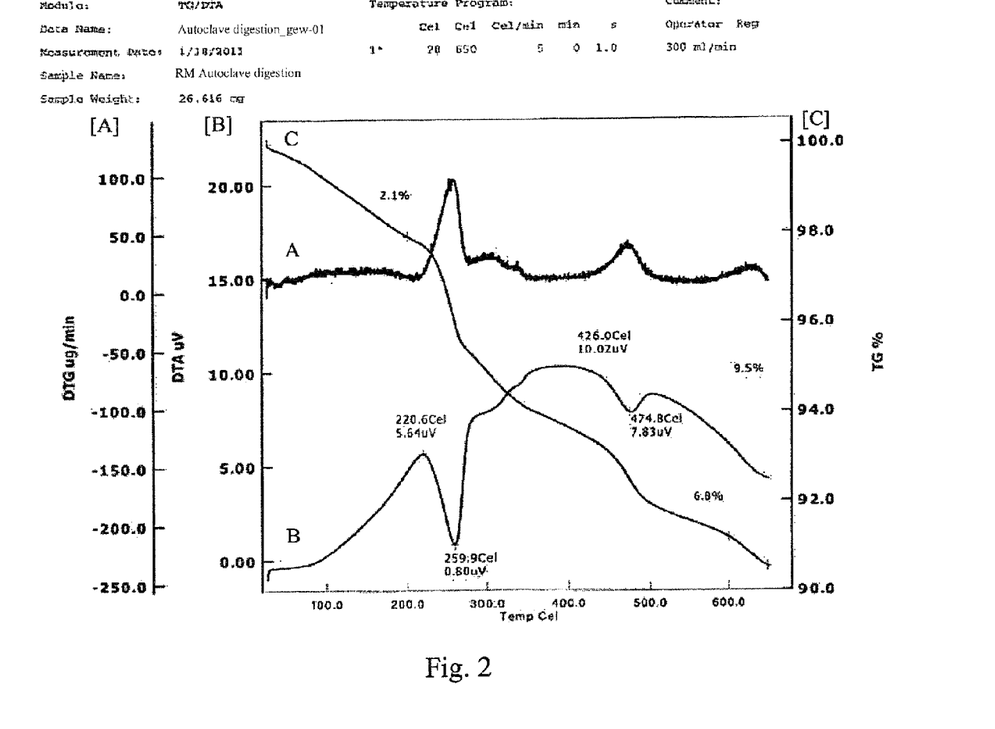
FIG. 2 shows DTA and TG curves of a washed red mud sample from the autoclave digestion. Between 220° C. and 280° C. an endothermic reaction of residual fractions of gibbsite and boehmite is documented, no reaction of goethite.
Figure 3:
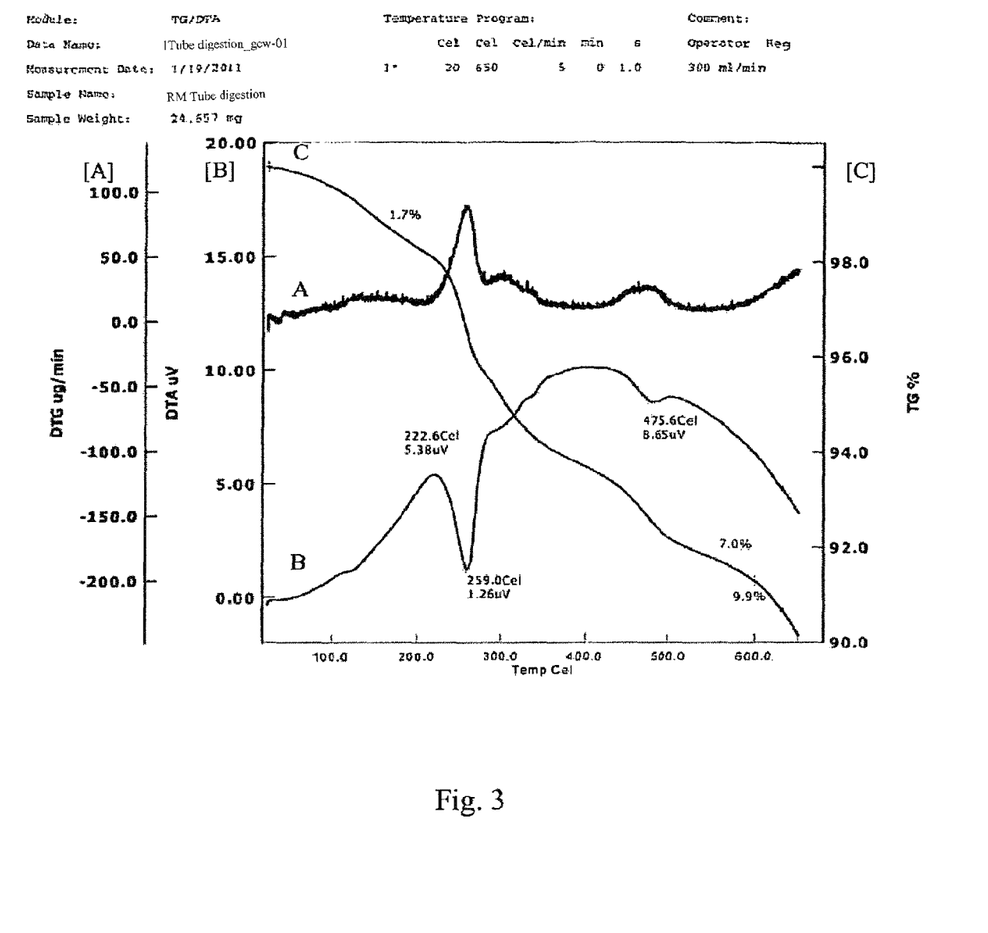
FIG. 3 shows DTA and TG curves of a washed red mud sample from the tube digestion. Between 220° C. and 280° C. an endothermic reaction of residual fractions of gibbsite and boehmite is documented, no reaction of goethite.
Figure 4:
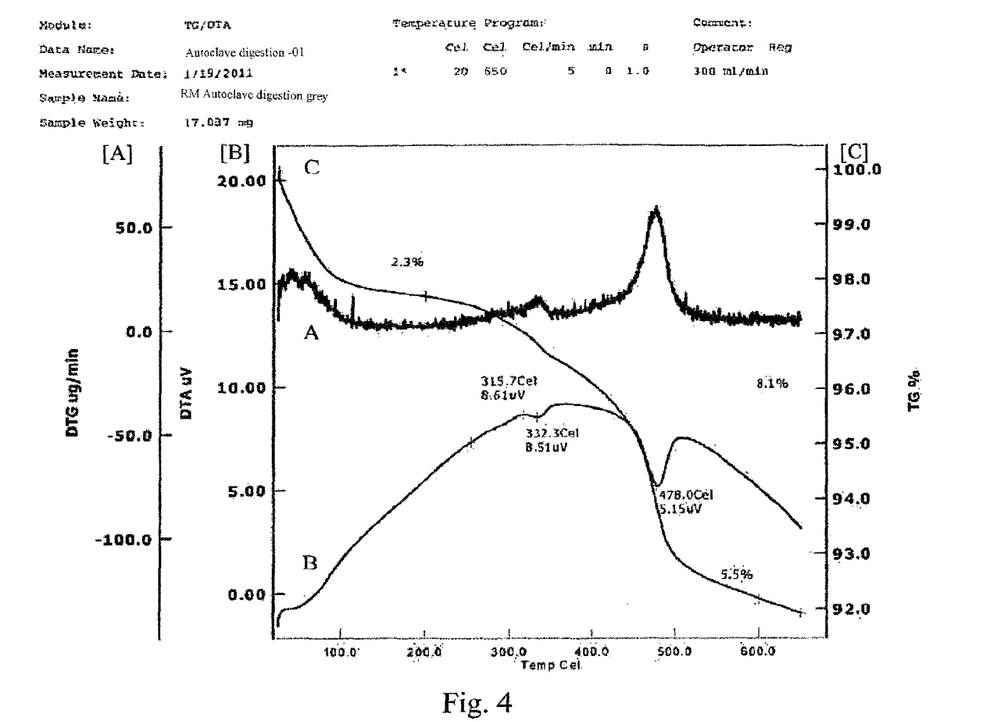
Figure 5:
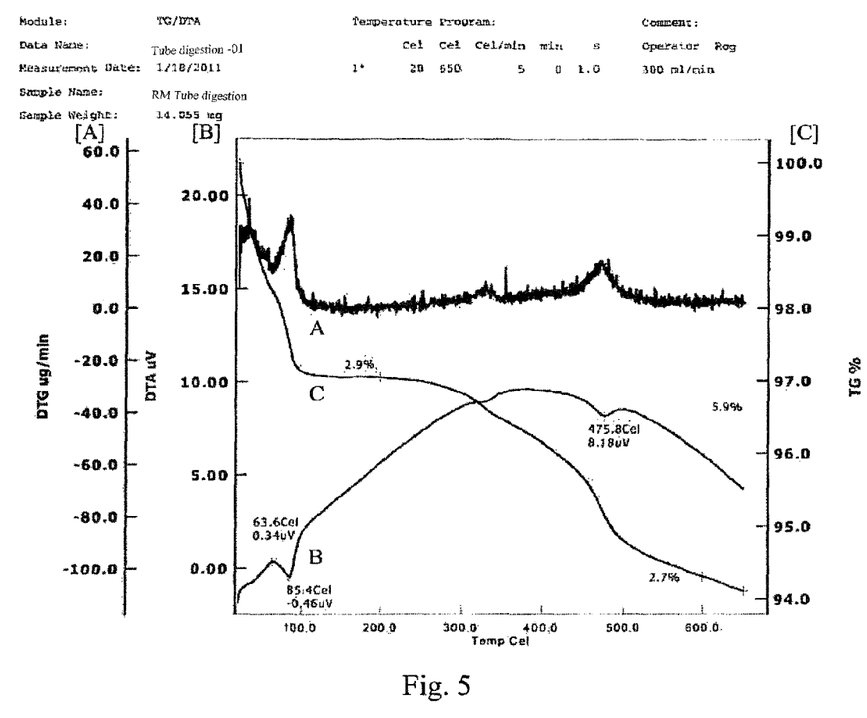
FIG. 5 shows DTA and TG curves of the filter residue (undissolved fractions) after acidic digestion of a red mud sample from the tube digestion. Endothermic reactions cannot be ascertained. Thus in the acidic digestion all endothermically reacting constituents have been dissolved out, also the oxides (cf. radiographic analysis)
Figure 6:
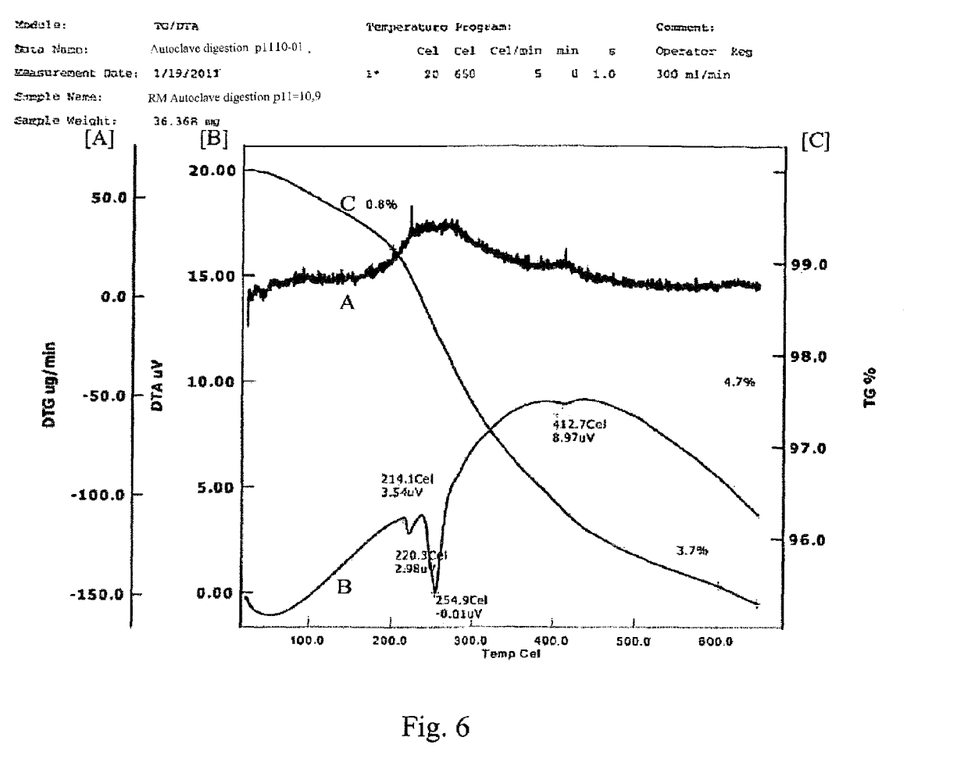
FIG. 6 shows DTA and TG curves of the precipitation out of the filtrate of red mud from the autoclave digestion (pH 10,9). Marked endothermic reactions again occur between 214° C. and approximately 350° C. The reason for this is the contents of gibbsite, boehmite and goethite, which are produced by precipitation out of sulphuric acid solution after realkalisation, but amorphous.
Figure 7:
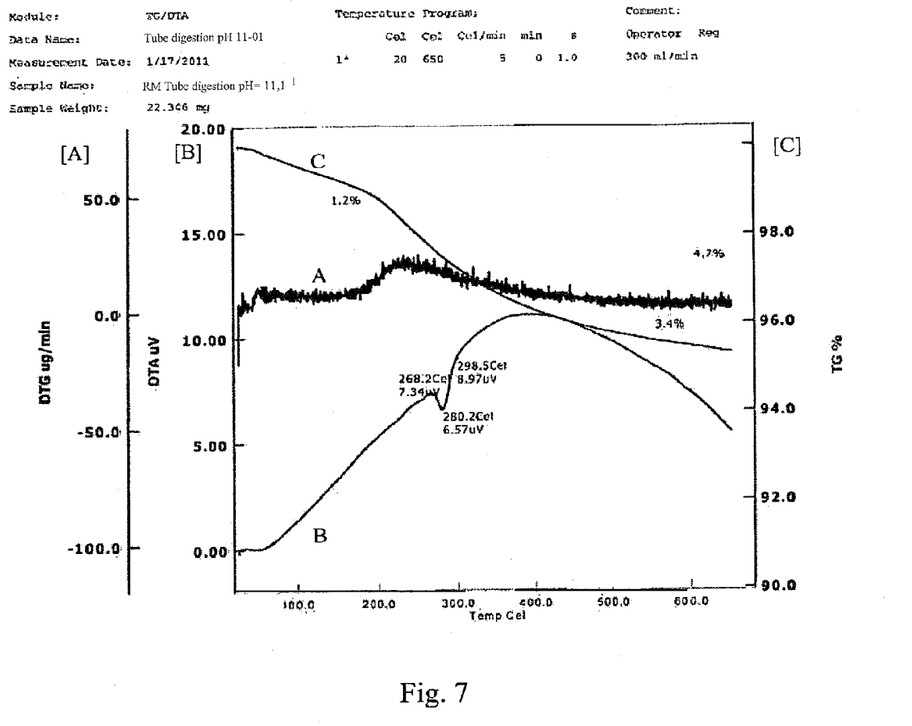
FIG. 7 shows DTA and TG curves of the precipitation out of the filtrate of red mud from the tube digestion (pH 11,1). Marked endothermic reactions again occur between 268° C. and approximately 350° C. The cause of this is above all goethite, since the aluminium has been predominantly dissolved out in the tube digestion on the basis of the hard conditions (270° C./60 bars). Under these conditions the goethite is transformed into haematite. After the rehydration the haematite is again present as endothermically reacting goethite.
Figure 8:
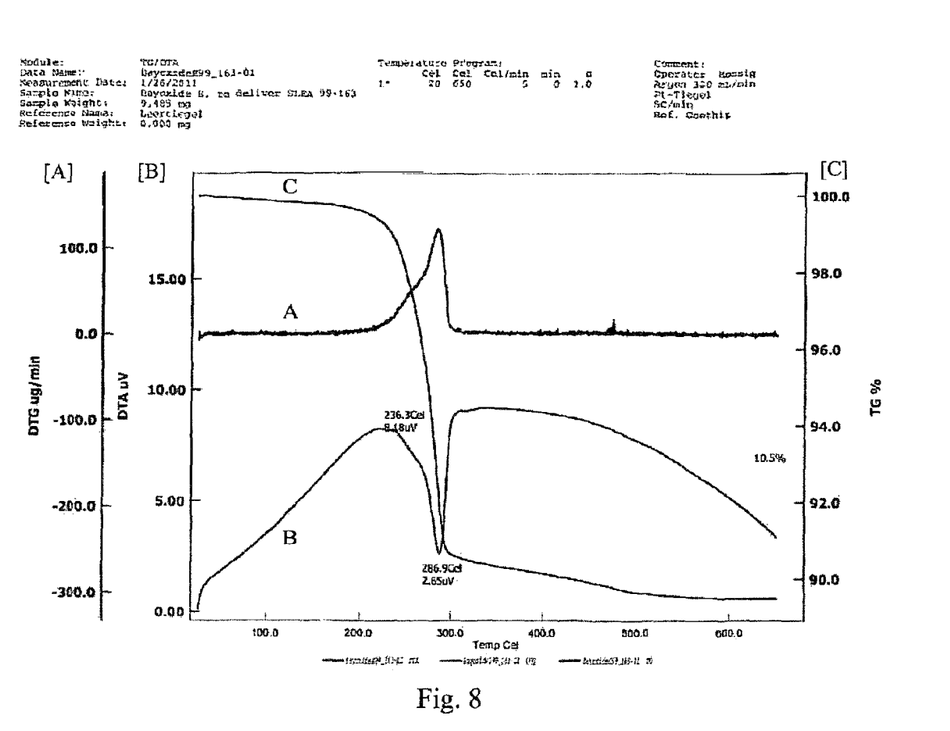
FIG. 8 shows DTA and TG curves of the goethite reference Bayoxide E 99 163. The endothermic reactions occur between 236° C. and approximately 350° C. They are comparable with the endothermic reaction from the precipitation of tube digestion filtrate from tube digestion RM.

In the red mud (RM) the hydroxides/oxide hydroxide of aluminium (gibbsite and boehmite) and of iron (goethite) are above all responsible for the endothermic reaction. FIG. 1 shows the thermoanalytical curves (DTA) of boehmite (FIG. 1a), hydrargillite (gibbsite) (FIG. 1b) and goethite (FIG. 1c) (from G. Liptay, Atlas of thermoanalytical curves, Heyden & Son Ltd., London 1973).

Depending upon the residual content of hydroxides/oxide hydroxide and oxides of aluminium and of iron in the red mud (RM) produced in the Bayer process, after rehydration all salts of the aluminium and iron can be recovered almost completely as hydroxides/oxide hydroxide. The chemical analysis of the red mud (RM) specifies how high the maximum content of hydroxides/oxide hydroxide can be after the rehydration. Thus the endothermic effect is also defined.

Higher endothermic effects which go beyond the possibilities of rehydration of the hydroxides/oxide hydroxide and oxides present in the RM can only occur due to addition of hydroxides/oxide hydroxide for example of aluminium, iron or magnesium.

Example 1+2

Approximately 50 g of a red mud sample from an autoclave and a tube digestion process are suspended with 200 ml of a 70% $H_2SO_4$ and then stirred for 1 hour. For acceleration of the dissolving process 600 ml of distilled water are added to each of the two suspensions. Next to the heat effect occurring in this case the suspensions are additionally heated on the heating plate to approximately 80-90° C. The dissolving process is ended after the red colour of the suspension has disappeared and the undissolved residue has taken on a grey colour. After the separation off of the residue by means of vacuum filtration it is washed with a little water and then dried at 105° C. in the drying cabinet.

The two acidic filtrates from the red mud (RM) from an autoclave and a tube digestion are neutralised by careful addition of NaOH solution. By further addition of NaOH, in the alkaline range (pH value 10-11) the dissolved salts of iron and aluminium are then precipitated out as hydroxides or oxide hydroxide. Because of the high proportion of iron the deposits are red-brown in colour. The suspension is then filtered off and the filter residue is washed with hot distilled water in order to at least partially wash sodium sulphate and caustic soda solution out of the filter residue. The filter residue is then dried at 105° C. in the filter cabinet.

The two resulting samples from the autoclave and tube digestion processes are then examined radiographically and thermoanalytically.

Radiographic Results

Because of the rapid precipitation without the addition of seed crystals the hydroxides and oxide hydroxide are predominantly obtained in amorphous form. With regard to the mineralogical composition the following contents for compositions of iron and aluminium could be determined semi-quantitatively (see Table 2).

TABLE 2

| | Radiographic results | |
|---|---|---|
| Constituent | Starting material RM from autoclave digestion | Starting material RM from tube digestion |
| red mud original | haematite gibbsite boehmite | haematite gibbsite boehmite |

TABLE 2-continued

| | Radiographic results | |
|---|---|---|
| Constituent | Starting material RM from autoclave digestion | Starting material RM from tube digestion |
| Undissolved fractions (filter residue) | None hydroxides/oxide hydrates or oxides of Al or Fe | None hydroxides/oxide hydrates or oxides of Al or Fe |
| Alkaline precipitation from the filtrate after separation off of the undissolved fractions | (pH 10.0) goethite (amorphous) boehmite (amorphous) gibbsite (amorphous) | (pH 11.1) goethite (amorphous) |

FIGS. 2-8 show the conversion of oxides to hydroxides or oxide hydroxides, or oxide hydrates to hydroxides in the case of aluminium. These figures show DTA (differential thermal analysis), TG (thermogravimetry) and DTG (differential thermogravimetry) measurements.

DRAWINGS

FIG. 4 shows DTA and TG curves of the filter residue (undissolved fractions) after acidic digestion of a red mud sample from the autoclave digestion.

endothermic reactions cannot be ascertained. Thus in the acidic digestion all endothermically reacting constituents have been dissolved out, also the oxides (cf. radiographic analysis);

DISCUSSION

Depending upon the digestion process, i.e. autoclave or tube digestion, red muds still contain residues of Al and Fe compounds. The Al compositions may be present as hydroxides (gibbsite), oxide hydroxides (boehmite) or as oxides (gamma $Al_2O_3$). In the case of red mud from autoclave digestion, Fe compounds are present predominantly as haematite, in the case of tube digestion they are present almost exclusively as haematite.

According to the described process, i. e. after acidic digestion, almost all hydroxides/oxide hydroxides and oxides of aluminium are are dissolved like iron. After further precipitation, for example in the alkaline medium, the Al and Fe compounds are precipitated out almost completely as hydroxides/oxide hydroxides. The content of oxides reduces considerably or vanishes.

Thus it is documented that due to rehydration oxides are converted back into hydroxides/oxide hydroxides, or oxide hydrates (in the case of Al) are converted into hydroxides. Thus the content of Al and Fe compounds contained in the initial RM can be almost complete converted into endothermically reacting substances. Regardless of the provenance of the RM, i.e. regardless of the initial bauxite and of the particular digestion process chosen, the endothermic reaction of the RM is boosted to a maximum with respect to the chemical content of Al and Fe compounds in the initial red mud. Thus it is possible to produce a novel substance which is outstandingly suitable for use as an IFA. Furthermore, all the above-mentioned reactions and processes can be carried out with the substance MR2S according to example embodiments of the present disclosure.

Embodiments

Therefore a fireproofed material system is disclosed which comprises a combustible material and a flame-retardant agent, characterised in that the flame-retardant agent comprises a mineral composition which comprises
   10-50% by weight of iron compounds
   12-35% by weight of aluminium compounds
     5-17% by weight $SiO_2$,
     2-21% by weight $TiO_2$,
     0.5-6% by weight CaO and
     3-10% by weight $Na_2O$.

It is disclosed that in the MR2S the ratio of iron hydroxide (goethite) to iron oxide (haematite) is shifted almost exclusively in the direction of goethite. It is disclosed that in the MR2S the ratio of aluminium hydroxide (gibbsite) and aluminium oxide hydroxides (boehmite) to aluminium oxide (gamma $Al_2O_3$) is shifted significantly in the direction of aluminium hydroxide/aluminium oxide hydroxides.

In this case the mineral composition can comprise 10-45, 30-50, or 40% by weight $Fe_2O_3$.

In this case the mineral composition can comprise 12-30, 20-35, or 25% by weight $Al_2O_3$.

In this case the mineral composition can comprise 5-17, 10-17, or 15% by weight $SiO_2$.

In this case the mineral composition can comprise 5-21, 2-15, or 7% by weight $TiO_2$.

In this case the mineral composition can comprise 0.5-6, 0.5-2.5, 0.5-1.5 or 1% by weight CaO.

In this case the mineral composition can comprise 5-10, 3-6, 8-10 or 0.02% by weight $Na_2O$.

In this case each of the ranges given above are combined. In particular the mineral composition can comprise
   40% by weight of iron compounds
   25% by weight of aluminium compounds
     15% by weight $SiO_2$,
     7% by weight $TiO_2$,
     1% by weight CaO and
     0.02% by weight $Na_2O$,
wherein the ratio of hydroxides and oxide hydroxides to oxides in the compounds of Fe and Al is significantly on the side of the hydroxides/oxide hydroxides.

The mineral composition may be modified rehydrated red mud (MR2S). The red mud from which MR2S is produced may originate from the production of alumina or ATH according to the Bayer process in the autoclave digestion or tube digestion process from domestic or imported bauxites as raw material in the most important industrial countries in all parts of the world, in particular Germany, Australia, Iceland, China, India, USA or Jamaica.

The material system may be a building material, a plastic product, a rubber product, a chipboard, or a cable sheathing. In particular the material system may be a tarpaulin, a carpet back coating, a floor covering, a roofing membrane, a conveyor belt, a cable, a profiled section (made of plastic for windows, doors), a pipe, a seal, a chipboard, injection moulding, laminate, a circuit board, a tube, casting resin, foam or the like.

The material system can comprise the flame retardant in a proportion of 3-95% by weight.

The proportion of flame retardant in the material system may be dependent upon the particular combustible material used or the material system. In this case the highest possible flame-retardant effect should be ensured with simultaneous optimisation of the physical technical characteristics of the combustible material and of the material system obtained with regard to workability, stability and flexibility. In the case of a IFA with high endothermic enthalpy the degree of filling can be reduced so that in particular the physical characteristics of the combustible system undergo less change.

In particular the material system can contain the flame retardant in a proportion of 3-90, 3-80, 3-70, 3-60, 3-50, 3-40, 3-30, 3-20, 3-15, 3-10, 3-4% by weight. In particular the material system can contain the flame retardant in a proportion of 10-90, 20-90, 30-90, 40-90, 50-90, 60-90, 70-90, 80-90% by weight. Furthermore each of these range boundaries can be combined with another range boundary. Thus the range 80-90% by weight may be formed from the ranges 3-90 and 3-80% by weight, or range 70-90% by weight may be formed from the ranges 5-70 and 30-90. Furthermore the material system can comprise the flame retardant in a percentage by weight of 3-95 comprise, wherein each value in this range is regarded as disclosed.

The flame-retardant agent can comprise the mineral composition (MR2S) in a proportion of 30-100% by weight and the respective remaining proportion of 0-70% by weight can be formed by a further flame-retardant composition.

The flame-retardant agent can also comprise the mineral composition in a proportion of 40-100, 50-100, 60-100, 70-100, 80-100, 90-100, 30-90, 30-80, 30-70, 30-60, 30-50, or 30-40% by weight and the respective remaining proportion of 0-70% by weight can be formed by a further flame-retardant composition. As already explained above, these ranges can be combined so that for example the ranges 40-100 and 30-70% by weight can be combined into 40-70% by weight. Furthermore the flame retardant can comprise the mineral composition in a percentage by weight of 30-100 comprise, wherein each value in this range is regarded as disclosed.

The further flame-retardant composition may comprise an inorganic non-toxic endothermically reacting substance.

The further flame-retardant composition may in particular comprise salt hydrates, hydroxides and carbonates. Hydroxides which may be considered are for example aluminium trihydroxides, goethite or magnesium dihydroxide, both as synthetic MDH with a specific (BET) surface of 2 to 50 m$^2$/g and a mean particle diameter (d50) of <<1 μm (so-called nanomagnesium hydroxide) and also natural ground brucite, which also contains or may contain proportionate hydromagnesite or magnesium hydroxycarbonate in variable amounts, with a grain size (mean particle diameter) (d 50) of up to 50 μm, preferably up to 10 μm. Salt hydrates which may be considered are for example sodium or calcium silicate hydrates, calcium aluminium sulphate hydrates and the like. Carbonates which may be considered are for example calcium carbonate, calcium bicarbonate, magnesium carbonate and the like.

MR2S has a maximum content of soluble Na$_2$O of 0.03% by weight, preferably 0.003-0.03% by weight.

MR2S has a grain size of 0.5-50 μm, preferably 0.5-10 μm.

The present document also discloses the use of the flame-retardant material described above as flame retardant for combustible material systems, combustible building materials, plastic, rubber, chipboard material, or cable sheathings.

Furthermore, the present document discloses a process for production of fireproofed material systems, comprising the steps:
a. providing a combustible material,
b. blending or coating the combustible material with the flame-retardant material, and thereby
c. obtaining a fireproofed material system.

The mineral composition in the flame-retardant agent mentioned in step b. may be fine-grained and may preferably have a mean particle size (d 50) of 0.5-10 μm, 0.5-9, 0.5-8, 0.5-7, 0.5-6, 0.5-5, 0.5-4, 0.5-3, 0.5-2, 0.5-1, 1-9, 2-9, 3-9, 4-9, 5-9, 6-9, 7-9, 8-9 μm. Any range which can be formed by combination of the range boundaries is regarded as disclosed.

The flame-retardant agent may be physically processed, in particular ground, before the blending or coating in the step b. The grinding may serve to reduce the flame-retardant agent to any average grain size. The grain size achieved may have any value between 0-10 μm. If MR2S is obtained in grain size >10 μm, for specifial applications MR2S with a grain size >10 μm can be used without grinding.

Furthermore the flame-retardant agent can be improved by coating or surface treatment with substances in order to improve the compatibility of the flame-retardant agent with one of the combustible agents disclosed here, in particular a polymer or a polymer matrix.

For coating of the surface of the flame-retardant agent, conventional coupling systems according of the general prior art, in particular silanes, fatty acids and softeners are used. This serves primarily for simplification of the processing/incorporation in particular in polymer matrices, which may be elastomeric, thermosetting or thermoplastic. In addition the characteristic profile of the IFA system according to example embodiments of the present disclosure can be influenced specifically with regard to the required characteristic profile combinations. The MR2S solely or in combination can be blended with the synergists according to example embodiments of the present disclosure, such as nanoclays, after-glow suppressants (zinc borates and boric acid derivatives, zinc stannates/hydroxystannates) and other halogen-free IFA and can then be jointly surface-modified. Alternatively mixtures of MR2S with the synergists can also be used in master batch form.

By surface coating alone and/or in combination in particular with nanoclays (Cloisites from SCP in, Gonzales, Tex., USA) it is possible that the ash produced in the event of fire is produced in a polymorphic, vitreous consistency with considerable residual elasticity.

EXAMPLES

Initial investigations were carried out in order to determine the effect of modified rehydrated RM on the combustion properties and mechanical properties of different plastics. The aim of the experiments was to establish whether the ATH and MDH usually employed can be partially and/or completely replaced by MR2S.

The experiments were conducted on two polar plastics (PVC and ethylene vinylacetate (EVA)) and two non-polar plastics (PE and PP) by comparison with pure ATH or MDH respectively.

The examples serve for guidance and illustration, not for limitation, whilst the scope of protection of the patent is defined exclusively by the claims.

Example 1

PVC

The basic raw materials used were:
standard PVC-U for window profiled section
Martinal OL 104//LEO (Albemarle, Bergheim) ATH component as reference substance for with comparison MR2S (zero sample).

MR2S as inorganic flameproofing agent (IFA) with the following composition:

| | |
|---|---|
| Fe2O3 | 33.12% (ratio hydroxides/oxides 6, 3 to 1) |
| Al2O3 | 25.68% (ratio hydroxides/oxides 4, 2 to 0.9) |
| SiO2 | 11.16% |
| TiO2 | 7.55% |
| CaO | 3.20% |
| Na$_2$O | 0.03% |

Initially dryblends were produced in a container mixer (CM 80, Mixaco). Profiled sections were produced from the dryblends using a contrarotating double screw extruder of the type DS 7.22 from Weber Maschinenfabrik. The extrusion temperature was between 180° C. and approximately 190° C.

Test objects were machined out of the produced profiled sections for tensile tests (DIN EN ISO 527, type 1 B) and fire test (DIN 4102, process B).

The following formulations were produced:
PVC-U formulation for window profiled section with 4% inorganic flameproofing agent
Composition of the Inorganic Flameproofing Agent:

| | | |
|---|---|---|
| 100% ATH | 0% IFA | (zero sample) IFA is equal to MR2S |
| 80% ATH | 20% IFA | (sample 1) |
| 50% ATH | 50% IFA | (sample 2) |

-continued

| | | |
|---|---|---|
| 20% ATH | 80% IFA | (sample 3) |
| 0% ATH | 100% IFA | (sample 4) |

The following tests were carried out:
TENSILE strength [MPa] DIN EN ISO 527

| | |
|---|---|
| 44.18 ± 1.37 | zero sample |
| 46.67 ± 0.28 | sample 1 |
| 45.67 ± 0.28 | sample 2 |
| 45.40 ± 0.32 | sample 3 |
| 48.51 ± 3.16 | sample 4 |

Tensile Modulus of Elasticity (E-Modulus)[MPa] DIN EN ISO 527

| | |
|---|---|
| 2923 ± 226 | zero sample |
| 3068 ± 164 | sample 1 |
| 2991 ± 97 | sample 2 |
| 2983 ± 36 | sample 3 |
| 2952 ± 99 | sample 4 |

Combustion Properties DIN 4102, Process B

For checking of the fire behaviour the test objects were subjected to a fire test (according to DIN 4102, process B). In the test the ignition on the edge of the test object, the combustion rate and the burning particles and droplets of the building material were evaluated.

In the fire test with all formulations the upper measurement mark is not reached by the peak of the flame of the burning test specimen. The burning test specimen is extinguished beforehand by itself. Accordingly all samples belong to fire class K1.

The fire behaviour according to DIN 4102 process B remains unchanged by partial or complete replacement of ATH by IFA.

Example 2

EVA

In the production of EVA formulations was ZSE 27 Mxx was employed as compounding machine. The extrusion temperature was between 145° C. and 160° C. An extrusion granulator was used for the production of granules. During compounding it was ascertained that the IFA has significantly better flowability than ATH, which significantly simplifies the incorporation and dispersion. Test objects were injection moulded from the EVA compound for the tensile impact strength test (DIN EN ISO 8256), tensile test (DIN ISO 527) and the oxygen test (LOI, DIN ISO 4589-2).
Starting Material
  EVA with 1.2% adhesion promoter and 0.4% stabiliser
  Martinal OL 104/LEO (ATH component)
  MR2S as inorganic flameproofing agent (IFA)
Formulations
  EVA with 60% flameproofing agent
Composition of the Flameproofing Agent

| | | |
|---|---|---|
| 100% ATH | 0% IFA | zero sample |
| 66.7% ATH | 33.3% IFA | sample 1 |
| 50% ATH | 50% IFA | sample 2 |
| 33.3% ATH | 66.7% IFA | sample 3 |

The following tests were carried out:
Tensile Strength [MPa] DIN EN ISO 527

| | |
|---|---|
| 6.16 ± 0.05 | zero sample |
| 6.17 ± 0.05 | sample 1 |
| 6.29 ± 0.05 | sample 2 |
| 6.42 ± 0.05 | sample 3 |

Tensile Modulus of Elasticity [MPa] DIN EN ISO 527

| | |
|---|---|
| 93 ± 2 | zero sample |
| 88 ± 2 | sample 1 |
| 87 ± 3 | sample 2 |
| 90 ± 2 | sample 3 |

Elongation at Break [%] DIN EN ISO 527

| | |
|---|---|
| 120.57 ± 13.83 | zero sample |
| 96.30 ± 6.01 | sample 1 |
| 108.27 ± 8.69 | sample 2 |
| 117.51 ± 4.92 | sample 3 |

Impact Strength [KJ/m2] DIN EN ISO 8256

| | |
|---|---|
| 139.27 ± 4.83 | zero sample |
| 139.78 ± 4.18 | sample 1 |
| 138.27 ± 5.66 | sample 2 |
| 149.00 ± 8.33 | sample 3 |

Combustion Properties
  Oxygen index [%] according to DIN EN ISO 4589-2

| | |
|---|---|
| 36.3 ± 0.10 | zero sample |
| 32.1 ± 0.4 | sample 1 |
| 30.1 ± 0.7 | sample 2 |
| 30.0 ± 0.1 | sample 3 |

Example 3

PE

The PE-based formulations were plasticised and homogenised in a co-rotating twin-screw kneader ZSE 18 HPE. The temperatures in the compounder were between 190° C. and 220° C. Test objects were produced by an injection moulding process from the PE compounds for the tensile test (DIN EN ISO 527, type 1 B), for the impact strength test (DIN EN ISO 179) and for the fire test (UL 94).
Starting Materials:
  PE Magnesia 7287/Brenntag, magnesium hydroxide chemically pure (MDH, zero sample) MR2S as inorganic flameproofing agent (IFA)
Formulations
  PE with 50% flameproofing agents
Composition of the Flameproofing Agent:

| | | |
|---|---|---|
| 100% MDH | 0% AFM | zero sample |
| 70% MDH | 30% AFM | sample 1 |

-continued

| | | |
|---|---|---|
| 50% MDH | 50% AFM | sample 2 |
| 30% MDH | 70% AFM | sample 3 |

The following tests were carried out:
Tensile Strength [MPa] DIN EN ISO 527

| | |
|---|---|
| 25.49 ± 0.28 | zero sample |
| 25.41 ± 0.20 | sample 1 |
| 25.51 ± 0.13 | sample 2 |
| 25.81 ± 0.14 | sample 3 |

Tensile Modulus of Elasticity [MPa] DIN EN ISO 527

| | |
|---|---|
| 2755 ± 102 | zero sample |
| 2457 ± 113 | sample 1 |
| 2521 ± 60 | sample 2 |
| 2632 ± 116 | sample 3 |

Elongation at Break [%] DIN EN ISO 527

| | |
|---|---|
| 1.99 ± 0.27 | zero sample |
| 1.82 ± 0.16 | sample 1 |
| 1.87 ± 0.18 | sample 2 |
| 3.09 ± 0.30 | sample 3 |

Charpy Impact Strength [KJ/m2] DIN EN ISO 179

| | |
|---|---|
| 6.85 ± 0.85 | zero sample |
| 6.28 ± 0.54 | sample 1 |
| 5.94 ± 0.33 | sample 2 |
| 7.53 ± 0.34 | sample 3 |

Flammability Properties [mm/min] UL 94 Horizontal Test

| | |
|---|---|
| 13.8 ± 0.25 | zero sample |
| 12.8 ± 0.22 | sample 1 |
| 13.7 ± 0.33 | sample 2 |
| 16.3 ± 0.34 | sample 3 |

Example 4

PP

The formulations based on PP were plasticised and homogenised in a co-rotating twin-screw kneader ZSE 18 HPE. The temperatures in the compounder were between 190° C. and 220° C. Test objects were produced by an injection moulding process from the PE compounds for the tensile test (DIN EN ISO 527, type 1 B), for the impact strength test (DIN EN ISO 179) and for the fire test (UL 94).

Starting Materials
PP
Magnesia 7287/Brenntag, magnesium chemically purely (MDH component, zero sample) MR2S as inorganic flameproofing agent (IFA)

Formulations
PP with 50% flameproofing agents
Composition of the Flameproofing Agent

| | | |
|---|---|---|
| 100% MDH | 0% AFM | zero sample |
| 70% MDH | 30% AFM | sample 1 |
| 50% MDH | 50% AFM | sample 2 |
| 30% MDH | 70% AFM | sample 3 |

The following tests were carried out:
Tensile Strength [MPa] DIN EN ISO 527

| | |
|---|---|
| 27.29 ± 0.20 | zero sample |
| 28.17 ± 0.10 | sample 1 |
| 28.43 ± 0.10 | sample 2 |
| 29.38 ± 0.83 | sample 3 |

Tensile Modulus of Elasticity [MPa] DIN EN ISO 527

| | |
|---|---|
| 3893 ± 112 | zero sample |
| 3886 ± 109 | sample 1 |
| 3606 ± 100 | sample 2 |
| 3695 ± 116 | sample 3 |

Elongation at Break [%] DIN EN ISO 527

| | |
|---|---|
| 1.34 ± 0.09 | zero sample |
| 1.35 ± 0.09 | sample 1 |
| 1.47 ± 0.12 | sample 2 |
| 1.43 ± 0.11 | sample 3 |

Charpy Impact Strength [KJ/m$^2$] DIN EN ISO 179

| | |
|---|---|
| 12.77 ± 0.70 | zero sample |
| 11.18 ± 0.60 | sample 1 |
| 11.01 ± 0.84 | sample 2 |
| 10.92 ± 0.99 | sample 3 |

Flammability Properties [mm/min] UL 94 Horizontal Test

| | |
|---|---|
| 11.5 ± 0.32 | zero sample |
| 12.2 ± 0.29 | sample 1 |
| 12.7 ± 0.16 | sample 2 |
| 14.4 ± 0.04 | sample 3 |

DISCUSSION

All formulations comply with DIN 4102, process B or the horizontal test according to UL 94 (requirement: combustion rate <40 mm/min). The measured combustion rates lie significantly below the required values.

Thus by the initial tests of PVC, EVA, PE and PP compounds it is demonstrated according to example embodiments of the present disclosure that modified rehydrated RM (MR2S), which was compounded in the tests without any additional treatment (for example surface coating with vinyl silane), produces comparable results both with regard to its fire behaviour by comparison with ATH and MDH and with regard to the mechanical characteristics achieved by comparison with ATH and MDH, that is to say it can be used successfully.

With regard to the flame-retardant effect of MR2S it is not important what contribution the individual endothermically reacting constituents of the MR2S such as for example goethite, gibbsite, boehmite or the like make in what temperature ranges and whether for example synergistic effects occur amongst one another. It is merely important that the sum of the contributions for flame inhibition of all endothermically reacting substances contained in the MR2S is comparable to the flame-retardant effect of ATH and MDH.

The endothermic effect of the flame-retardant substance produced by the elimination of water and the evaporation of water is crucial for the flame-retardant effect. The measure is the endothermic enthalpy which is measured in J/g.

The endothermic enthalpy may be measured by thermogravimetry (TG), differential thermal analysis (DTA) and dynamic differential scanning calorimeter measurements (DSC).

Initial measurements confirm that RM, as it is produced in the Bayer process, has only low endothermic enthalpy with very marked fluctuations. On the other hand, modified rehydrated RM (MR2S) has significantly higher endothermic enthalpy with lesser fluctuations, since by rehydration the oxides of Fe and Al were converted back into hydroxides/oxide hydroxides which only react endothermically. Thus uniform IFA tailored to the particular material systems can be produced from MR2S.

In the initial tests with MR2S as IFA the fire protection behaviour and the mechanical characteristics of the material system are compared with those of ATH and MDH as IFA. The results show that MR2S brings results comparable with ATH and MDH. Since MR2S exhibits entdothermic enthalpy between 180° C. and 350° C., MR2S can partially or completely replace both ATH and MDH. By comparison with RM from which the MR2S is produced by modification, in particular rehydration, MR2S is a completely different substance chemically and mineralogically and in its endothermic behaviour. In contrast to RM, MR2S is comparable with ATH and MDH as IFA. By means of measurements with a powder x-ray diffractometer, DTA, TG and DSC it can be shown that the modification, in particular the rehydration, has shifted the ratio of hydroxides/oxide hydroxides to oxides in favour of hydroxides/oxide hydroxides, which is equated with higher endothermic enthalpy. The connection between specific endothermic enthalpy measured in J/g and the degree of filling in the respective material systems is of greater importance. The endothermy of gibbsite is approximately 1000 J/g, of boehmite is approximately 500 J/g and of goethite is approximately 260 J/g. However, if the density of gibbsite (p=2.4 g/cm3), boehmite (p=2.98 g/cm3) and goethite (p=4.17 g/cm3) is taken into account with respect to the working volume, the endothermic effect of the three most important endothermically reacting constituents in the MR2S converge. Goethite then provides a high contribution.

Degree of filling x specific endothermic enthalpy is the "package" which effects the flame inhibition. The higher the specific endothermic enthalpy is, the lower the degree of filling must be, which is important both for economic reasons and also for reasons of the mechanical characteristics of the material system. The mechanical characteristics of the material system are changed to a lesser extent as the degree of filling is lower.

No toxic or corrosive gases are produced during the thermal decomposition of MR2S.

The mechanical characteristics of compounds produced with MR2S are measured in the tests and show similar results by comparison with compounds produced with ATH or MDH. Surface treatments of flame-retardant substances, for example with silanes, fatty acids or softeners assist the compatibility of the filler with the polymer matrix and improve the mechanically characteristics of the compound.

The same surface treatments which are used in ATH and MDH can also take place in MR2S and lead to optimised characteristics.

Also the particle size and grain size distribution of the employed IFA play an important role for the compound characteristics. It is part of the prior art that the products based on ATH and MDH previously on the market are specifically adjusted with regard to particle size and grain size distribution. Whereas for example ATH can be produced by finely divided precipitation reactions, in the case of MR2S, because of its insolubility in water, grinding processes and sieving must be used for micronising. The fact that RM like MR2S occurs in very finely divided form is favourable.

The thermal stability of ATH products extends up to 225° C., that of MDH extends up to 340° C. In this respect in practice at processing temperatures <200° C. ATH products are usually used, and at processing temperatures >200° C. MDH products are usually used. According to example embodiments of the present disclosure, MR2S can be used at processing temperatures <200° C. and >200° C.

IFA based on ATH, MDH and according to example embodiments of the MR2S are used in particular in polymers, but also other combustible material systems:

Examples of polymers are: acrylic dispersions, acrylic resins, elastomers, epoxy resins, latex dispersions, melamine resins, PA, PE, PE copolymers, thermoplastic PE copolymers, cross-linked PE copolymers, phenolic resins, polyester resins (UP), polyurethane, PP, PVC, PVC plastisols, TPU, vinyl ester resins, and the like. Examples of uses are: tarpaulins, carpet back coatings, floor coverings, roofing membrane, conveyor belts, cables, profiled sections, pipes, chipboards, injection mouldings, laminates, circuit boards, tubes, casting resins, foams, and many others.

Thus with aspects of the present disclosure it is possible to produce a novel substance, i.e. MR2S, which can be used in material systems of all kinds as halogen-free, inorganic, non-toxic flame retardant, from RM which is produced in the Bayer process according to the autoclave process or the tube digestion process, by chemical reactions such as for example by rehydration or by other modifications. Because of the high temperature range in which MR2S reacts, MR2S can partially or completely replace ATH and/or MDH.

The invention claimed is:

1. Inorganic, halogen-free flameproofing agent comprising modified rehydrated red mud (MR2S) with a mineral composition of 10 to 50% by weight of iron compounds,
12 to 35% by weight of aluminium compounds,
5 to 17% by weight of silicon compounds,
2 to 21% by weight of $TiO_2$ and
0.5 to 6% by weight of calcium compounds, wherein the compounds of iron have a hydroxide and oxide hydroxide proportion that, by weight, is equal to or greater than an oxide proportion of the iron compounds, and wherein the compounds of aluminium have a hydroxide and oxide hydroxide proportion that, by weight, is equal to or greater than an oxide proportion of the aluminium compounds.

2. Inorganic, halogen-free flameproofing agent comprising modified rehydrated red mud (MR2S) as claimed in claim 1, further comprising soluble $Na_2O$ in the proportion equal to or less than 0.03% by weight.

3. Inorganic, halogen-free flameproofing agent comprising modified rehydrated red mud (MR2S) as claimed in claim 1, characterised in that the modified rehydrated red mud (MR2S) has a mean particle size (d 50) less than or equal to 50 μm.

4. Inorganic, halogen-free flameproofing agent comprising modified rehydrated red mud (MR2S) as claimed in claim 1, characterised in that the modified rehydrated red mud (MR2S) has a residual moisture in the proportion less than or equal to 0.4% by weight.

5. Inorganic, halogen-free flameproofing agent comprising modified rehydrated red mud (MR2S) as claimed in claim 1, wherein a further flame-retardant additive is admixed in a proportion of 0 to 70% by weight with the flameproofing agent.

6. Inorganic, halogen-free flameproofing agent comprising modified rehydrated red mud (MR2S) as claimed in claim 5, wherein the further flame-retardant additive is an endothermically reacting substance.

7. Inorganic, halogen-free flameproofing agent comprising modified rehydrated red mud (MR2S) as claimed in claim 6, wherein the endothermically reacting substance is ATH, gibbsite, boehmite, MDH, goethite or a mixture thereof.

8. Fireproofed material system comprising a combustible material and a flameproofing agent as claimed in claim 1.

9. Material system as claimed in claim 8, characterised in that the material system is a building material, a plastic product, a rubber product, a chipboard, or a cable sheathing.

10. Material system as claimed in claim 8, characterised in that the material system comprises the flameproofing agent in a proportion of 3-95% by weight.

11. Material system as claimed in claim 8, characterised in that the flameproofing agent comprises the mineral composition in a proportion of 30-100% by weight and the respective remaining proportion of 0-70% by weight is formed by a further flame-retardant composition.

12. Material system as claimed in claim 11, characterised in that the further flame-retardant composition comprises an inorganic non-toxic endothermically reacting substance.

13. Material system as claimed in claim 11, characterised in that the further flame-retardant composition comprises salt hydrates, hydroxides and carbonates.

14. A method comprising:
using the flameproofing agent as claimed in claim 1 as flame retardant for combustible material systems, combustible building materials, plastics, rubber, chipboard material or cable sheathings.

\* \* \* \* \*